O. J. SHINER, DEC'D.
M. E. SHINER, ADMINISTRATRIX.
APPARATUS FOR MIXING OIL WITH CHEMICALS.
APPLICATION FILED FEB. 2, 1914.
1,102,696. Patented July 7, 1914.
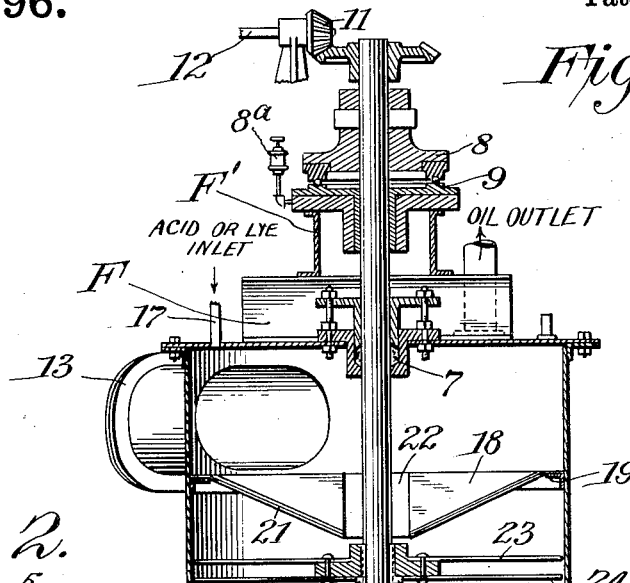
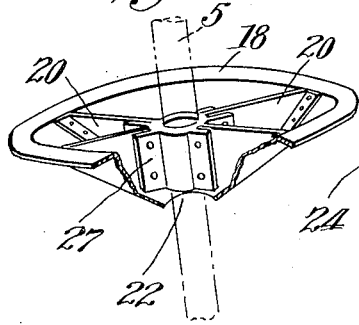
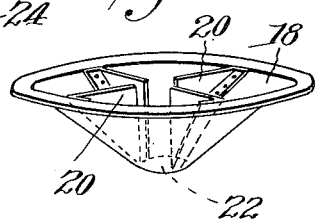
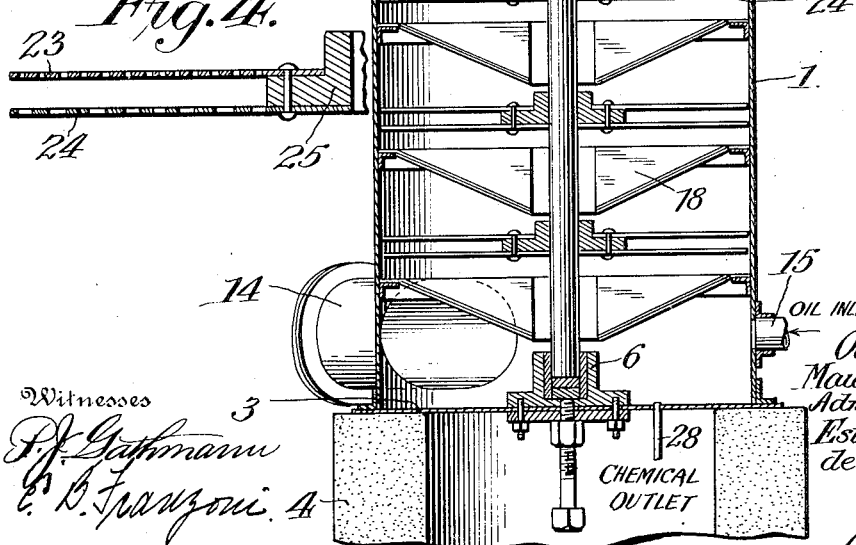
Inventor
Oliver J. Shiner
Maud E. Shiner
Administratrix of the
Estate of Oliver J. Shiner
deceased.
By her Attorneys
Baldwin Wight

UNITED STATES PATENT OFFICE.

OLIVER J. SHINER, DECEASED, LATE OF BAYONNE, NEW JERSEY, BY MAUD E. SHINER, ADMINISTRATRIX, OF BAYONNE, NEW JERSEY.

APPARATUS FOR MIXING OIL WITH CHEMICALS.

1,102,696.     Specification of Letters Patent.     Patented July 7, 1914.

Original application filed May 27, 1913, Serial No. 770,208. Divided and this application filed February 2, 1914. Serial No. 816,126.

*To all whom it may concern:*

Be it known that OLIVER J. SHINER, late a citizen of the United States, residing in Bayonne, county of Hudson, and State of New Jersey, invented certain new and useful Improvements in Apparatus for Mixing Oil with Chemicals, of which the following is a specification.

The application for this patent is a division of an application for patent filed by said OLIVER J. SHINER on May 27th, 1913, No. 770,208, for methods of and apparatus for purifying oils. In said application I have shown and described apparatus for purifying burning oil distillates such as kerosene and naphtha in which the oil after being brought to the proper temperature is mixed with sulfuric acid in a mixer of improved construction, is then washed and brought to a higher temperature and then mixed with an alkali solution in a mixer of similar construction to that above referred to. The oil having been thus treated with an alkali, being separated from the alkali and in a purified condition is delivered for final treatment or for storage.

The application for the present invention relates to the mixing apparatus above referred to.

The purpose of this mixing apparatus is to bring the acid and oil or the alkali and oil into intimate contact with each other in a subdivided or atomized condition. It is an important part of the apparatus described in said before mentioned application.

Briefly stated, this mixer comprises a container provided with an oil inlet at the bottom and an inlet at the top for the acid or alkali with which the oil is treated, and said container is provided also with an oil outlet at the top and a chemical outlet at the bottom. A rotary shaft extends vertically through the container and carries a series of pairs of perforated plates arranged in series one above the other and attached to said rotary shaft, while a series of stationary pans within the container arranged one above each pair of plates deliver to the central portion of the plates. Oil and chemical are admitted simultaneously to the container, the oil being lighter rising and flowing out at the top while the chemical being heavier passes in an opposite direction and leaves the container at the bottom thereof. That part of the mixed oil and chemical which is in the pans has but little rotary movement but passes upwardly and downwardly in the manner above described, but as the oil rises and as the chemicals descend they pass through the perforations of the lower plate of each pair of plates and while between the two plates of a pair the oil and chemicals are given a rotary motion which throws them centrifugally outward while the upward pressure of the oil causes the oil to pass through the upper plates and then move upwardly into the next pan of the series while the chemicals descend into the next lower pan. These improvements are illustrated in the accompanying drawings, in which, Figure 1 shows a vertical central section through one of the mixers. Fig. 2 is a detail view in perspective of one of the pans which is provided with a hub for steadying the shaft which carries the rotary disks. Fig. 3 is a perspective view of one of the pans which is not thus provided with a hub. Fig. 4 is a detail view in section of a pair of plates showing how they are perforated and how they are attached to the vertical shaft which rotates them.

The cylinder or container 1 is supported vertically on a suitable foundation 4 and is closed at opposite ends by heads 2 and 3. Centrally arranged within the cylinder is a vertical shaft 5 resting on an adjustable bearing 6 at its lower end and passing through a stuffing box 7 carried by the upper head 2. The shaft 5 also passes through a shaft mounting 8 which may be provided with ball-bearings 9 and at its upper end the shaft carries a beveled pinion 10 meshing with a corresponding pinion 11 on the driving shaft 12.

$S^a$ indicates a lubricator for the ball-bearings and the construction is such, as will be evident from an inspection of Fig. 1, that the weight of the shaft and the plates carried thereby is supported on the frame F, F' which in turn is mounted on the top of the cylinder. It is also to be considered that the weight of the shaft and the disks is largely supported by the oil which flows upwardly through the container. By these means the shaft may be relieved of strain and friction and comparatively little power is required for rotating said shaft.

The cylinder 1 is provided with manholes 13 and 14 and it is equipped on its side near its lower end with an inlet 15 for oil and at the top with an outlet 16 for oil. It is also provided with an inlet 17 at the top for acid or lye. Otherwise the container may be of any suitable construction.

Within the cylinder 1 is arranged a vertical series of pans 18. These have a general conical shape, being of the general construction shown in Figs. 2 and 3. Each of the pans 18 is secured at its periphery 19 to the side wall of the cylinder in any suitable way and it is divided, preferably into four pockets by means of radial partitions 20. Each pan is open at the top and has a sloping bottom 21 provided with a central opening 22 surrounding the shaft 5. The pans are spaced apart as shown and between each two pans are arranged perforated plates 23, 24. Each pair of plates is attached to a hub 25 secured to and revolving with the shaft 5. One means for securing the hub 25 to the shaft is indicated at 26. These plates, which are circular and correspond in form with the interior diameter of the cylinder 1, extend close to the walls of the cylinder without touching it being free to revolve within the cylinder. The upper plate 23 of each pair is perforated preferably with one-quarter inch holes preferably spaced one inch between centers and the bottom plate 24 of each pair is preferably perforated with one-eighth inch holes preferably spaced one-half inch between centers. All of the plates are similarly constructed and are arranged as clearly shown in Fig. 1 of the drawings.

In order to provide a bearing for the shaft 5 about midway between the upper and lower ends of the cylinder, one of the pans is provided with a hub 27 which is attached to the partitions 20 in the manner shown in Fig. 2. This provides means for steadying the shaft 5 and is desirable inasmuch as the mixer may be of considerable height. The oil which enters at 15 passes up through the openings 22 of the several pans 18 while the acid or lye which enters at 17 descends through the oil to the bottom of the mixer and flows out at 28. The oil passes up through the openings 22 in the pans 18 and then up through the perforated plates. The acid or lye first enters the uppermost pan 18, passes down through the opening 22 of this pan and is received by the uppermost pair of plates 23, 24. Each pan serves to carry the chemicals into the center of the mixer and drop them down onto the revolving plates and the chemicals pass through the larger openings in the uppermost plates while the oil rises through the smaller openings in the lowermost plates. The revolving plates throw the oil and chemicals by centrifugal force toward the shell of the mixer and the oil, naphtha or other liquid being treated passes up through the center of the pan while the chemicals are passing down through said openings. In this way the chemicals and oil are thoroughly mixed.

The apparatus insures that the particles of oil and chemical are thoroughly atomized and for this reason the oils and chemicals may be passed continuously through the mixer. The construction is also such that while the oil and acid are thoroughly mixed, the acid is permitted to pass downward and the oil to pass upward and the conditions are such as to cause the formation of a viscous liquid known as acid sludge in the bottom of the apparatus, the entrained moisture entering with the oil being absorbed by the partially spent acid in the lower portion of the mixer, while the oil is treated in the upper portion of the mixer with fresh or stronger acid. The operation is progressive, the dried oil being subjected to acid of progressively increasing strength. When the apparatus is used for an alkaline treatment of the oil, the conditions are the same and the entrained moisture entering the apparatus with the oil at the lower part of the mixer is absorbed at the lower portion of the tank and the thus dried oil is treated in the upper portion of the tank by the alkali.

The dimensions of the mixer may be varied. In practice the tank has been 25 feet high and 7 feet in diameter, being provided with ten groups or pairs of revolving perforated plates and a corresponding number of pans. The pairs of plates are preferably placed about two feet apart and the two plates of each group are preferably from two to three inches apart. Burning oil distillate at a temperature of about 60° F. may be supplied at the bottom of the tank at the rate of 300 barrels (40 gallons to the barrel) per hour and sulfuric acid of 66° Baumé may be supplied at the top of said tank in sufficient quantity to produce the desired effect on the oil.

It has been found that about 20% less acid may be supplied than would be required to produce an equal purification in accordance with the current batch practice. About 5⅝ pounds of sulfuric acid at 66° Baumé per barrel (40 gallons to the barrel) of burning distillate are required according to this invention, while an equal amount of distillate according to the old method requires 7 pounds of such acid. The perforated plates may be revolved at the rate of 38 revolutions per minute, but the speed may be varied.

Naphtha may be introduced more rapidly than burning oil distillate, say at the rate of 450 barrels per hour and a smaller amount of sulfuric acid per barrel may be employed, say 2½ pounds of sulfuric acid of 66° Baumé per barrel, whereas by the old method 5 pounds of acid were necessarily used. It will thus be seen that not only is the operation continuous, but there is a large saving of acid by using the present invention.

It will be observed that the container is closed air-tight and the volatile gases are saved, whereas in the old batch method many of these gases were lost because the agitators employed were not closed airtight.

The apparatus may also be used for mixing other substances.

What is herein claimed as the invention of said OLIVER J. SHINER is:—

1. A mixer, comprising a container provided with an oil inlet at the bottom and an inlet at the top for a chemical with which the oil is to be treated and provided also with an oil outlet at the top and a chemical outlet at the bottom, a rotatable shaft extending vertically through said container, a series of pairs of perforated plates arranged in series one above the other within the container and attached to said rotatable shaft, and a series of stationary pans within the container one above each pair of plates and which deliver to the central portion of the plates, substantially as described.

2. A mixer, comprising a container provided with an oil inlet at the bottom and an inlet at the top for chemical with which the oil is to be treated and provided also with an oil outlet at the top and a chemical outlet at the bottom, a rotatable shaft extending vertically through said container, a series of pairs of perforated plates arranged in series one above the other within the container and attached to said rotatable shaft with the plates of each pair placed relatively close together and provided with perforations of different sizes and a series of stationary pans within the container one above each pair of plates each of which pans has a sloping bottom and a delivery opening above the central portion of a pair of plates.

3. A mixer for use in a continuous process for treating oil, comprising a container provided with an oil inlet at the bottom and an inlet at the top for a chemical with which the oil is to be treated and provided also with an oil outlet at the top and a chemical outlet at the bottom, a vertically arranged rotatable shaft extending through said container, a series of pairs of perforated plates arranged in series one above the other within the container attached to said rotatable shaft and extending radially therefrom close to the walls of the container and a series of stationary pans within the container one above each pair of plates, each of which pans has a bottom sloping from its periphery toward its center and is formed with a delivery opening above the central portion of a pair of plates.

Bayonne, New Jersey, January 31st, 1914.

MAUD E. SHINER,
*Administratrix of the estate of Oliver J. Shiner, deceased.*

Witnesses:
J. W. MOORE,
THOS. A. MURPHY.